US012663201B2

(12) United States Patent
Kim

(10) Patent No.: US 12,663,201 B2
(45) Date of Patent: Jun. 23, 2026

(54) REFRIGERATOR

(71) Applicant: LG Electronics Inc., Seoul (KR)

(72) Inventor: Minkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 18/537,185

(22) Filed: Dec. 12, 2023

(65) Prior Publication Data

US 2024/0191934 A1 Jun. 13, 2024

(30) Foreign Application Priority Data

Dec. 12, 2022 (KR) ........................ 10-2022-0172409

(51) Int. Cl.

*F25D 27/00* (2006.01)
*F21V 23/04* (2006.01)
*F21V 33/00* (2006.01)
*F25D 23/02* (2006.01)
*F21W 131/305* (2006.01)

(52) U.S. Cl.

CPC ........ *F25D 23/028* (2013.01); *F21V 23/0471* (2013.01); *F21V 33/0044* (2013.01); *F25D 27/00* (2013.01); *F21W 2131/305* (2013.01)

(58) Field of Classification Search

CPC ...... F25D 23/028; F25D 27/00; F25D 27/005; F25D 2700/00; F25D 2700/001

See application file for complete search history.

(56) References Cited

U.S. PATENT DOCUMENTS

2008/0143227 A1* 6/2008 Kim ........................ F25D 23/02 312/405
2020/0049401 A1* 2/2020 Staud ................. G03B 21/2033
2021/0396452 A1* 12/2021 Park ........................ G01S 17/88

* cited by examiner

*Primary Examiner* — Jonathan Bradford
(74) *Attorney, Agent, or Firm* — Fish & Richardson P.C.

(57) ABSTRACT

A refrigerator includes an upper door, a handle, and a lighting. The upper door includes an upper handle recessed upward from a lower surface of the upper door toward an inside thereof, and a lighting disposed at the lower surface of the upper door. The lighting is disposed rearward and downward relative to the upper handle.

20 Claims, 10 Drawing Sheets

REFRIGERATOR

CROSS-REFERENCE TO RELATED APPLICATION

This application claims priority to and the benefit of Korean Patent Application No. 10-2022-0172409, filed on Dec. 12, 2022, the disclosure of which is incorporated herein by reference in its entirety.

TECHNICAL FIELD

The present disclosure relates to a refrigerator, and in particular, a refrigerator that comprises a lighting part radiating light around a handle part.

BACKGROUND

Refrigerators supply cold air, generated based on a heat exchange with refrigerants circulating in a cooling cycle, to a storage compartment, and keep various types of storage items fresh in the storage compartment for a long period of time.

Lighting is installed in a storage compartment, to allow a user to check storage items in the storage compartment as the user opens the door of the storage compartment.

However, since additional lighting is not provided outside a refrigerator, a user needs another light source in the case where the user uses the refrigerator in the night, and inconvenience is caused to the user.

In particular, a pocket-type handle drawn inside the door of the refrigerator is hardly recognized by the user from the outside, making it hard for the user to recognize the position of the handle part in the night.

Additionally, a sensor part can be disposed at the door of the refrigerator and senses an approach of the user.

The sensor part cannot sense an approach of the user in a blind spot based on the position and angle of the sensor part, making it difficult for the sensor part to play its role properly.

For example, the sensor part senses a space formed by the user making a specific motion, such as a space between the open legs of the user, and wrongly senses that the user does not approach, although the user approaches to the sensor part.

Further, even in the case where a companion pet rather than the user approaches to the sensor part, the sensor part is likely to operate wrongly.

SUMMARY

The objective of the present disclosure is to provide a refrigerator comprising a lighting part that radiates light around a handle part, such that a user can readily find the position of the handle part even in the night.

The objective of the present disclosure is to provide a refrigerator that can reduce a blind spot as a sensor part operates.

The objective of the present disclosure is to provide a refrigerator that can reduce a sensing error of a sensor part, caused by a specific behavior of a user, or an operational error of the sensor part, caused by an approach of a companion pet.

The objective of the present disclosure is to provide a refrigerator that can reduce a sense of difference felt by a user toward a handle part, caused by heat generated by a lighting part.

The objective of the present disclosure is to provide a refrigerator that can allow a user to readily find the position of a handle part of a lower door as well as the position of a handle part of an upper door, by using a lighting part disposed at the upper door.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

In a refrigerator of one aspect, an upper handle part being drawn upward inside an upper door, and a lighting part being disposed at the rear of the upper handle part are disposed on the lower surface of the upper door, and the lighting part is disposed further downward than the upper handle part.

Specifically, the upper handle part, and the lighting part disposed at the rear of the upper handle part are disposed on the lower surface of the upper door, allowing a user to readily find the position of the upper handle part even in the night, and allowing the lighting part to radiate light reliably and uniformly without being interfered with by a hand of the user even when the user puts a hand into the upper handle part.

The refrigerator comprises a cabinet comprising an upper storage compartment and a lower storage compartment that are disposed respectively in an up-down direction, an upper door opening and closing a front of the upper storage compartment, and a lower door opening and closing a front of the lower storage compartment.

At this time, an upper handle part being drawn upward inside the upper door, and a lighting part being disposed at a rear of the upper handle part are disposed on a lower surface of the upper door, and the lighting part is disposed further downward than the upper handle part.

In another aspect, a protrusion part protruding further downward than the upper handle part that comprises an insertion groove drawn upward inside the upper door may be disposed on the lower surface of the upper door, and the lighting part may be inserted into the insertion groove.

In another aspect, the lighting part may be disposed to face the lower door, a lower handle part being drawn downward inside the lower door may be disposed on an upper surface of the lower door, and a rear surface of the lower handle part may be disposed further rearward than a rear surface of the upper handle part.

In another aspect, the rear surface of the lower handle part may incline rearward from a lower portion of the lower handle part to an upper portion thereof.

In another aspect, the upper door may comprise an upper outer door being disposed on a front surface of the upper door, an upper door liner being disposed on a rear surface of the upper door, and an upper door cap deco being disposed on a lower surface of the upper door, and the upper handle part and the lighting part may be disposed at the upper door cap deco.

In another aspect, the upper door may comprise a chamfer part being disposed at one side of a lower portion of the rear surface of the upper door, and a minimum distance between the upper handle part and the chamfer part may be greater than a minimum distance between the upper outer door and the upper door liner.

In another aspect, the upper door may comprise a hinge part rotating around one side of the cabinet, the hinge part may be disposed further rearward than the upper handle part, and the hinge part and the lighting part may be disposed to overlap each other with respect to an extension line extending in a left-right direction of the upper door.

In another aspect, a sensor part may be disposed at a slant on the lower surface of the upper door, to face a central line with respect to a left-right direction of the cabinet.

In another aspect, the sensor part may be a proximity sensor sensing an approach of a user.

In another aspect, a sensing line extending from the sensor part to a sensible point of the sensor part may cross the central line.

In another aspect, a maximum sensible point of the sensor part may be on the central line.

In another aspect, the sensor part may be disposed horizontally with respect to an up-down direction of the cabinet.

In another aspect, the upper door may comprise a hinge part rotating around one side of the cabinet, and the sensor part may be disposed in a way that the sensor part is eccentric to the hinge part with respect to a left-right direction of the upper door.

In another aspect, the sensor part may protrude further downward than the lower surface of the upper door.

In another aspect, the upper door may comprise an upper door body part at which a hinge part rotating around the other side of the cabinet is disposed, and an upper sub door which is disposed on a front surface of the upper door body part, to rotate around one side of the upper door body part, the lighting part may be disposed at the upper door body part, and the upper handle part may be disposed at the upper sub door.

In another aspect, the upper door may comprise a first upper door comprising a first lighting part, and a second upper door comprising a second lighting part, the first lighting part and the second lighting part may be turned on in first predetermined brightness, as the sensor part senses an approach of a user, the first lighting part and the second lighting part may be turned off, in a case where one or more of the first upper door and the second upper door are opened, and the first lighting part and the second lighting part may be turned on in the first predetermined brightness, in a case where the first upper door and the second upper door are closed in a state where the sensor part senses an approach of the user.

In another aspect, the upper door may comprise a first upper door comprising a first lighting part, and a second upper door comprising a second lighting part, the first lighting part and the second lighting part may be turned on in first predetermined brightness, as the sensor part senses an approach of a user, the first lighting part and the second lighting part may be turned on in second predetermined brightness greater than the first predetermined brightness, in a case where the lower door is opened, and the first lighting part and the second lighting part may be turned on in the first predetermined brightness, in a case where the lower door is closed in a state where the sensor part senses an approach of the user.

In another aspect, the upper door may comprise a first upper door comprising a first lighting part, and a second upper door comprising a second lighting part, the first lighting part and the second lighting part may be turned on in first predetermined brightness, as the sensor part senses an approach of a user, and the first lighting part and the second lighting part may dim off in a case where the user escapes from a sensible point of the sensor part.

In the refrigerator of the present disclosure, the handle part and the lighting part disposed at the rear of the handle part are disposed respectively on the lower surface of the pair of upper doors, and the sensor part senses an approach of a user, such that the user readily finds the position of the handle part without an additional external light source even in the night, thereby enhancing user convenience and improving aesthetic qualities in design.

In the refrigerator of the present disclosure, the sensor part sensing an approach of a user is disposed on the lower surface of the upper door at a slant, toward the central line with respect to the left-right direction of the cabinet, such that one sensor part reduces a blind spot that cannot be sensed by the sensor part, with no need to install an additional sensor part respectively on the lower surface of the pair of upper doors.

In the refrigerator of the present disclosure, since the sensor part is disposed horizontally with respect to the up-down direction of the cabinet, the sensor part targets and senses an area near the upper ends of the legs of an ordinary user, thereby reducing a sensing error of the sensor part in a blind spot that is created in the case where the user opens the legs, or an operational error of the sensor part, caused by an approach of a companion pet.

In the refrigerator of the present disclosure, since the lighting part disposed at the rear of the handle part that is disposed on the lower surface of the pair of upper doors is inserted into and disposed in the protrusion part protruding downward, the handle part and the lighting part are spaced a predetermined distance apart from each other in the up-down direction as well as the front-rear direction, thereby reducing a sense of difference toward the handle part, which is felt by the user as the lighting part generates heat.

In the refrigerator of the present disclosure, since the rear surface of the lower handle part inclines rearward from the lower portion of the lower handle part to the upper portion thereof, a light radiation angle may be formed to radiate light of the lighting part disposed on the lower surface of the upper door to the inside of the lower handle part, thereby allowing the user to readily find the position of the handle part of the lower door as well as the position of the handle part of the upper door by using the lighting part disposed at the upper door.

Specific effects are described along with the above-described effects in the section of detailed description.

BRIEF DESCRIPTION OF DRAWINGS

The accompanying drawings constitute a part of the specification, illustrate one or more embodiments in the disclosure, and together with the specification, explain the disclosure, wherein.

DETAILED DESCRIPTION

Figure 1:
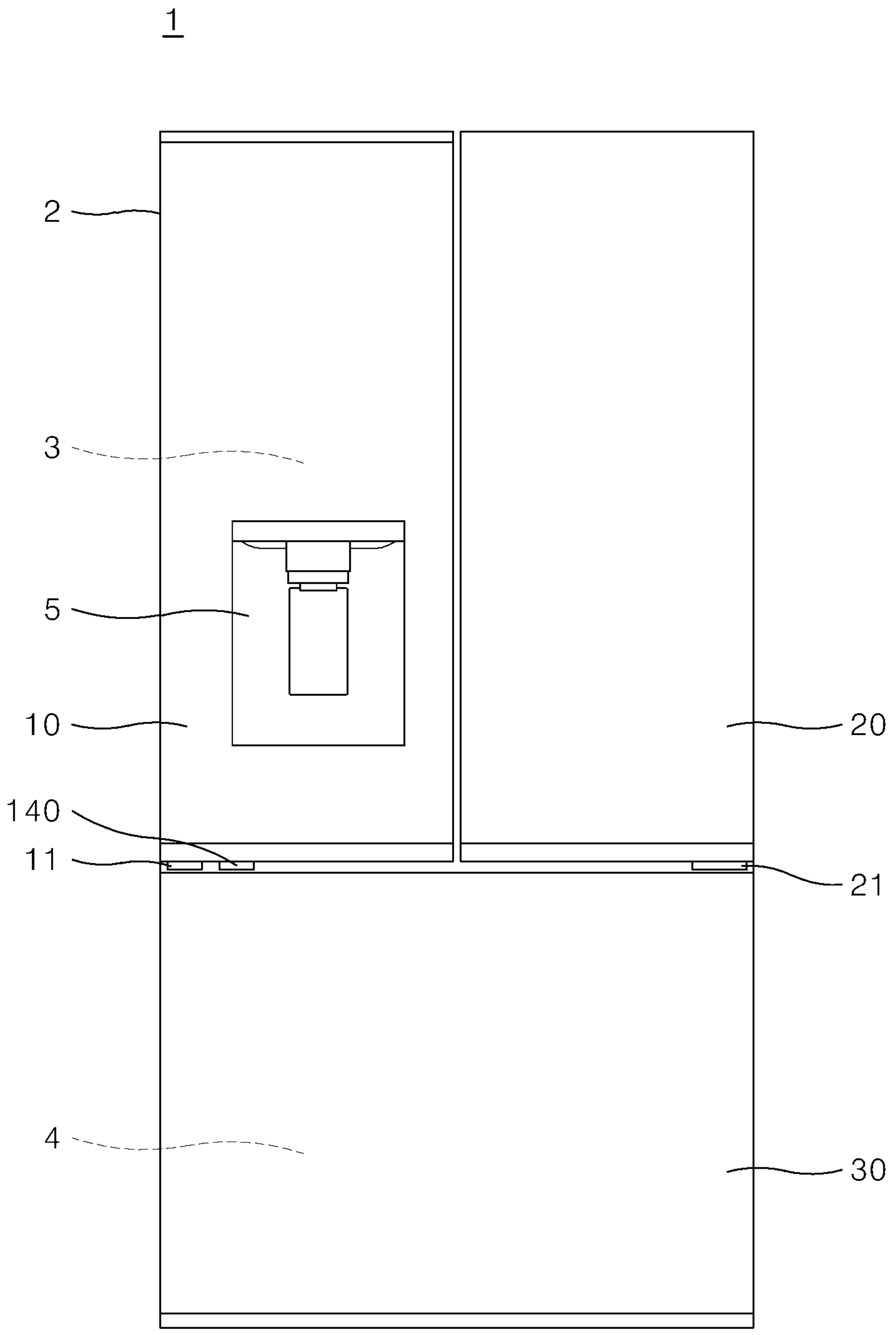
FIG. 1 is a front view showing a refrigerator.
Figure 2:
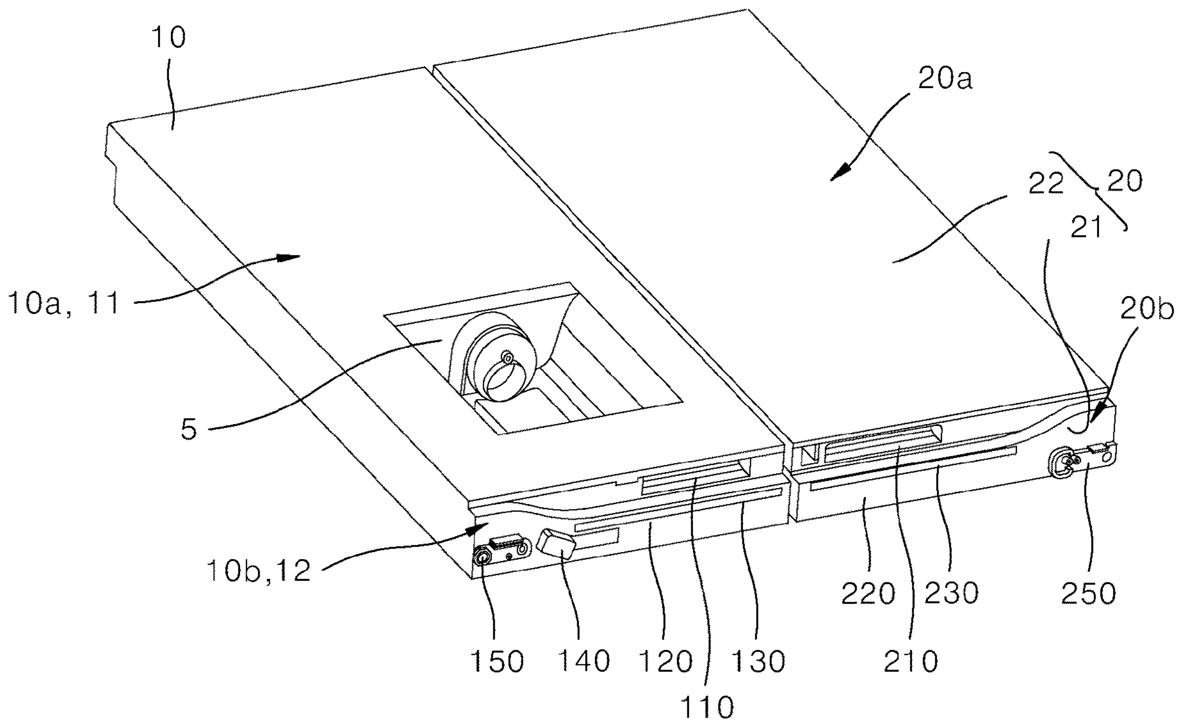
FIG. 2 is a perspective view showing a first upper door and a second upper door in a direction of the lower portion thereof.
Figure 3:
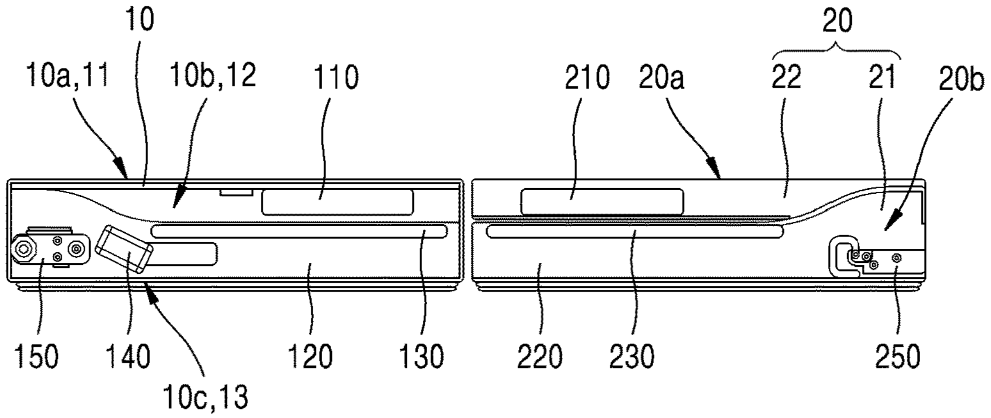
FIG. 3 is a bottom view showing a first upper door and a second upper door in a direction of the lower portion thereof.
Figure 4:
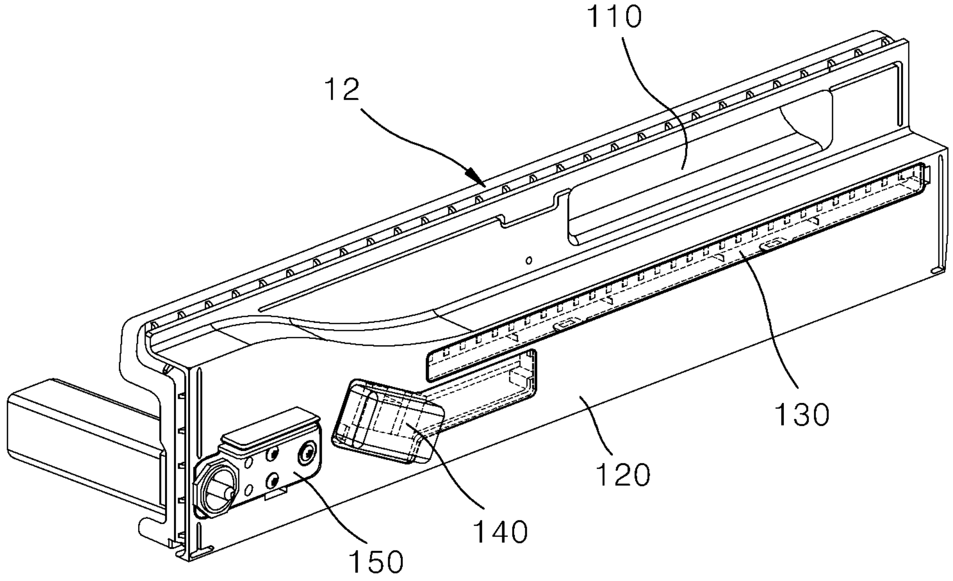
FIG. 4 is a view showing a first upper door cap deco at which a first upper handle part, a first lighting part, a sensor part, and a first hinge part are disposed.
Figure 5:
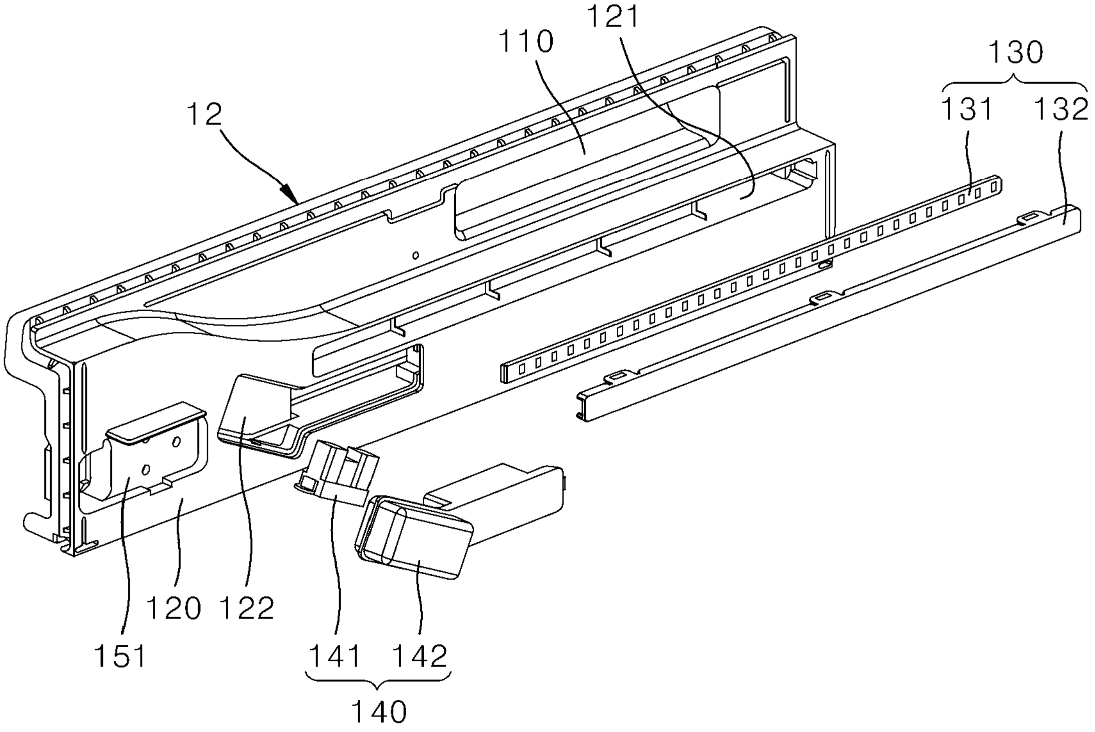
FIG. 5 is an exploded perspective view showing a first upper door cap deco at which a first upper handle part, a first lighting part, and a sensor part are disposed.

The above-described aspects, features and advantages are specifically described hereafter with reference to accompanying drawings such that one having ordinary skill in the art to which the subject matter of the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

Throughout the disclosure, each component can be provided a single one or a plurality of ones, unless stated to the contrary.

When any one component is described as being "in the upper portion (or the lower portion)" or "on (or under)" another component, any one component can be directly on (or under) another component, and an additional component can be interposed between the two components.

When any one component is described as being "connected", "coupled" or "connected" to another component, any one component can be directly connected or coupled to another component, but an additional component can be "interposed" between the two components or the two components can be "connected", "coupled" or "connected" by an additional component.

In the disclosure, singular forms include plural forms as well, unless explicitly indicated otherwise. In the disclosure, the terms "comprise", "being comprised of" and the like do not imply necessarily including stated components or stated steps and imply excluding some of the stated components or stated steps or including additional components or additional steps.

Throughout the disclosure, the terms "A and/or B" as used herein can denote A, B or A and B, and the terms "C to D" can denote C or greater and D or less, unless stated to the contrary.

Hereafter, a refrigerator in several embodiments is described.

A refrigerator 1 of one embodiment, and main components constituting the refrigerator 1 are described with reference to FIGS. 1 to 12.

Unless described otherwise, an up-down direction, a left-right direction and a front-rear direction in the present disclosure are defined with respect to a direction where the user in front of the refrigerator 1 sees the refrigerator 1.

The exterior of the refrigerator 1 may be formed by a cabinet 2 comprising one or more storage compartments 3, 4, as a storage space of an item, therein, and a plurality of doors 10, 20, 30 opening and closing an open front surface of the cabinet 2.

The cabinet 2 may be shaped into a box the front surface of which is open, and may be divided into one or more storage spaces and comprise a refrigerator compartment and/or a freezer compartment.

The cabinet 2 may comprise an upper storage compartment 3 and a lower storage compartment 4 that are disposed respectively vertically.

For example, the upper storage compartment 3 may be a refrigerator compartment, and the lower storage compartment 4 may be a freezer compartment, but not limited.

A first upper door 10 and a second upper door 20 that are a pair of upper doors opening and closing the front surface of the upper storage compartment 3 may be disposed on the front surface of the cabinet 2, corresponding to the upper storage compartment 3.

The first upper door 10 and the second upper door 20 may be a rotating door and respectively rotate through a first hinge part 150 and a second hinge part 250 that rotates around one side and the other side of the cabinet 2 as a rotation axis.

A lower door 30 may be disposed on the front surface of the cabinet 2, corresponding to the lower storage compartment 4, and open and close the front surface of the lower storage comportment 4.

The lower door 30 may be a drawer-type door that is inserted and drawn by a rail in the font-rear direction, but not limited. The lower door 30 may be a rotating door.

Additionally, one lower door 30 is illustrated in the present disclosure, but the number of lower doors is not limited. A plurality of lower doors 30 may be provided to open and close the lower storage compartment 4 in a segmented manner.

A dispenser part 5 for taking out driving water and ice may be disposed on the front surface of the first upper door 10.

The first upper door 10 may comprise a first upper outer door 11 being disposed on the front surface 10*a* of the first upper door 10, a first upper door liner 13 being disposed on the rear surface 10*c* of the first upper door 10, and a first upper door cap deco 12 being disposed on the lower surface 10*b* of the first upper door 10.

At this time, a side frame may be disposed on a lateral surface of the first upper door 10, and a cap deco may be disposed on the upper surface of the first upper door 10, to form the exterior of the first upper door 10.

Hereafter, the lower surface 10*b* of the first upper door 10 as a first upper door cap deco 12 is described, for example.

A first upper handle part 110, a first lighting part 130, a sensor part 140, and a first hinge part 150 may sit at the first upper door cap deco 12.

According to the present disclosure, since the first upper door cap deco 12 finishes the lower area of the first upper door 10 and has a structure in which the first upper handle part 110, the first lighting part 130, the sensor part 140 and the first hinge part 150 can be mounted, the spatial availability of the first upper door 10 may improve.

Additionally, in the state where the first upper handle part 110, the first lighting part 130, the sensor part 140 and the first hinge part 150 sit at the first upper door cap deco 12, the first upper door cap deco 12 may be fastened to the first upper door liner 13 and the first upper outer door 11, improving efficiency in assembly processing.

A pocket-type first upper handle part 110 may be disposed on the lower surface 10*b* of the first upper door 10 in a way that the pocket-type first upper handle part 110 is drawn upward inside the first upper door 10.

The first upper handle part 110 may be disposed in a way that the first upper handle part 110 is eccentric to the other side of the first upper door 10, which is opposite to one side of the first upper door 10 at which the first hinge part 150 is disposed, out of both lateral surfaces of the first upper door 10.

The first hinge part 150 may be disposed further rearward than the first upper handle part 110, and the first hinge part 150 and the first lighting part 130 may be disposed to overlap each other, with respect to an extension line that extends in the left-right direction of the first upper door 10.

The first upper handle part 110 may be formed in a way that the first upper handle part 110 extends in the left-right direction to have a predetermined length.

The first upper handle part 110 may be disposed at the front of the lower surface 10*b* of the first upper door 10, such that the user puts a hand into the first upper handle part 110 and opens and closes the first upper door 10 readily and rapidly.

However, since the first upper handle part 110 is drawn upward inside the first upper door 10, not to be seen by the user from the front surface of the refrigerator 1, the first lighting part 130 may be disposed at the rear of the first upper handle part 110 such that the user may find the position of the first upper handle part 110 easily.

The first lighting part 130 is turned on, to easily guide the position of the first upper handle part 110 for the user, as the user approaches to the refrigerator 1.

The first lighting part 130 may extend in the left-right direction to have a predetermined length, and a left-right length of the first lighting part 130 may be greater than a left-right length of the first upper handle part 110.

Since the first upper handle part 110 and the first lighting part 130 may be disposed to overlap each other with respect to the front-rear direction of the refrigerator 1, in the case where the first lighting part 130 is turned on, the first light part 130 may guide the position of the first upper handle part 110 more accurately for the user.

The first lighting part 130 may be formed at a first protrusion part 120 formed on the lower surface 10*b* of the first upper door 10.

Specifically, the first protrusion part 120 may protrude further downward than the first upper handle part 110 to have a predetermined height.

The first protrusion part 120 may be disposed further rearward than the first upper handle part 110.

A first insertion groove 121 may be formed at the first protrusion part 120 and drawn upward inside the first protrusion part 120, and the first lighting part 130 may be inserted into and fixed to the first insertion groove 121.

Accordingly, the first insertion groove 121 may extend in the left-right direction to have a predetermined length, and may have a left-right length greater than a left-right length of the first upper handle part 110.

Further, the first upper handle part 110 and the first insertion groove 121 may be disposed to overlap each other with respect to the front-rear direction of the refrigerator 1.

Since the first lighting part 130 is inserted into and fixed to the first insertion groove 121, the first lighting part 130 may radiate light toward the lower portion of the first upper door 10.

Thus, even in the case where the first lighting part 130 is turned on, light is not directly radiated to the user, and the possibility that the user is affected by glare may be reduced.

In the case where the first lighting part 130 is closely adjacent to the first upper handle part 110, heat that is generated as the first lighting part 130 is turned on is transferred to the first upper handle part 110, such that the user feels a sense of difference due to a difference in temperatures of the first upper handle part 110, in the case where the user puts a hand into the first upper handle part 110 and contacts the first upper handle part 110.

In the present disclosure, the first lighting part 130 is disposed further rearward than the first upper handle part 110, and inserted and disposed in the first protrusion part 120 protruding downward, such that the first upper handle part 110 and the first lighting part 130 may be spaced a certain distance apart from each other in the up-down direction as well as the front-rear direction.

Thus, even in the case where the first lighting part 130 is turned on, the transfer of heat from lighting to the first upper handle part 110 may decrease significantly, to reduce a sense of difference that may be felt by the user as the user puts a hand into the first upper handle part 110 and contacts the first upper handle part 110.

In the present disclosure, the first protrusion part 120 may provide a space into which the user puts a hand, at the first upper handle part 110.

The first upper handle part 110 is shaped into a pocket that is drawn from the lower surface 10*b* of the first upper door 10 to the inside of the first upper door 10 upward, and needs an enough space in which the user puts a hand.

Accordingly, a sufficient space that at least corresponds to the height of the first protrusion part 120 may be provided for the user to put a hand in to the first upper handle part 110, thereby enhancing user convenience.

In the present disclosure, the first lighting part 130 inserted and disposed in the first protrusion part 120 may be disposed further rearward and downward than the first upper handle part 110, the first lighting part 130 may not be interfered with by a hand of the user and radiate light constantly and reliably, even when the user puts a hand into the first upper handle part 110.

The first lighting part 130 may comprise a first lighting member cover 132 that protects a first lighting member 131, and the first lighting member 131 radiating light and finishes the lower surface of the first insertion groove 121.

For example, the first lighting member 131 may be provided in a way that a plurality of LED light-emitting elements is disposed on a substrate extending in one direction.

At this time, each of the LED light-emitting elements may radiate light in one color, but not be limited. Each of the LED light-emitting elements may radiate light to embody different colors such as red, green, blue (RGB).

The first lighting member cover 132 may extend in one direction in a way that the first lighting member cover 132 surrounds the front surface and the lateral surfaces of the first lighting member 131.

The first lighting member cover 132 may be hook-fastened to the first insertion groove 121 in a way that the first lighting member cover 132 is readily detachable from the first insertion groove 121 formed on the lower surface 10*b* of the first upper door 10.

The first lighting member cover 132 may comprise a light guide plate, or be formed to provide a function as a light guide plate, helping light radiated from the first lighting member 131 to be released far away and uniformly.

For example, the first lighting member cover 132 may be made of a translucent material, to prevent the creation of a spot where light concentrates, or further comprise a diffusion agent.

A first hinge insertion groove 151 may be formed at one side of the lower surface 10*b* of the first upper door 10, and the first hinge part 150 may be fixed to the first hinge insertion groove 151 and allow the first upper door 10 to swivel.

The first hinge insertion groove 151 may be formed at the first protrusion part 120.

A sensor insertion groove 122 that is drawn upward may be formed at the first protrusion part 120, and the sensor part 140 may be inserted into and fixed to the sensor insertion groove 122.

For example, since the sensor insertion groove 122 is eccentric to the first hinge part 150 with respect to the left-right direction of the first upper door 10, the sensor part 140 may also be eccentric to the first hinge part 150 with respect to the left-right direction of the first upper door 10.

The sensor part 140 may comprise a sensor 141 sensing an approach of the user, and a sensor cover 142 protecting the sensor 141 and finishing the lower surface of the sensor insertion groove 122.

The sensor 141 may be a proximity sensor that senses the user approaching to an area within a sensible point, based on a set sensible point.

The sensor 141 may sense an approach and an escape of the user within the set sensible point, and communicate with the controller of the refrigerator 1 to turn on and off the first lighting part 130 of the first upper door 10 and the second lighting part 230 of the second upper door 20.

In the present disclosure, the handle part 110, 210, and the lighting part 130, 230 disposed at the rear of the handle part 110, 210 may be disposed respectively on the lower surface of the pair of upper doors 10, 20, and the sensor part 140 may sense an approach of the user, enabling the user to easily find the position of the handle part 110, 210 without an additional external light source even in the night.

Thus, user convenience may improve, and thanks to high-end exterior design, aesthetic qualities may be provided.

The sensor cover 142 may comprise another area into which an additional component such as a printed circuit board for removing noise is inserted and fixed, in addition to an area into which the sensor 141 is inserted and fixed.

At this time, a partial area of the sensor cover 142 protecting the sensor 141 may protrude further downward than the first protrusion part 120.

Since the sensor 141 is accommodated in a partial area of the sensor cover 142, protruding further downward than the first protrusion part 120, the sensor 141 may be disposed to protrude further downward than the first protrusion part 120.

Figure 8:
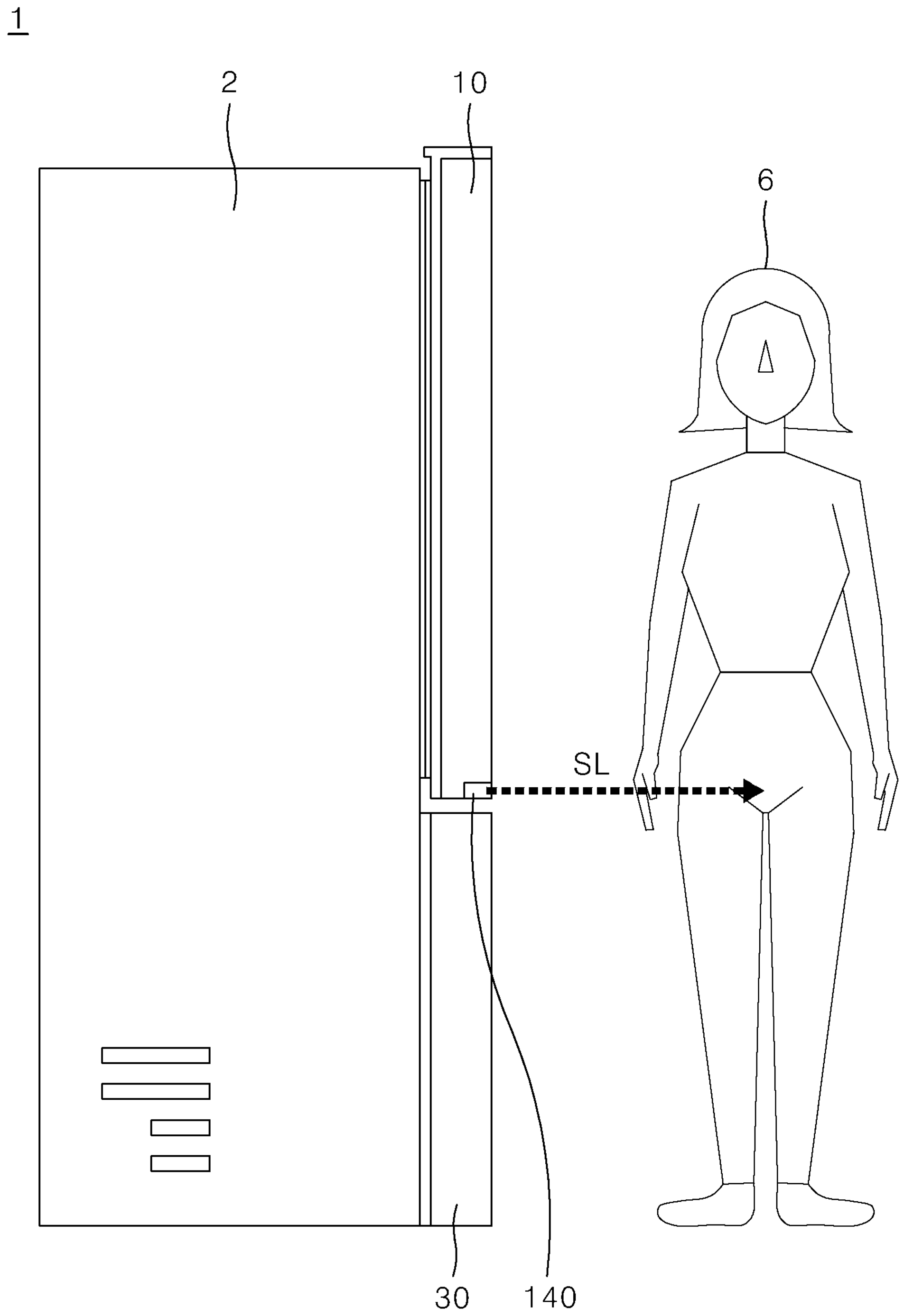
FIG. 8 is a side view showing a user and a refrigerator that are placed at a point where a sensor part can perform sensing.
Figure 10:
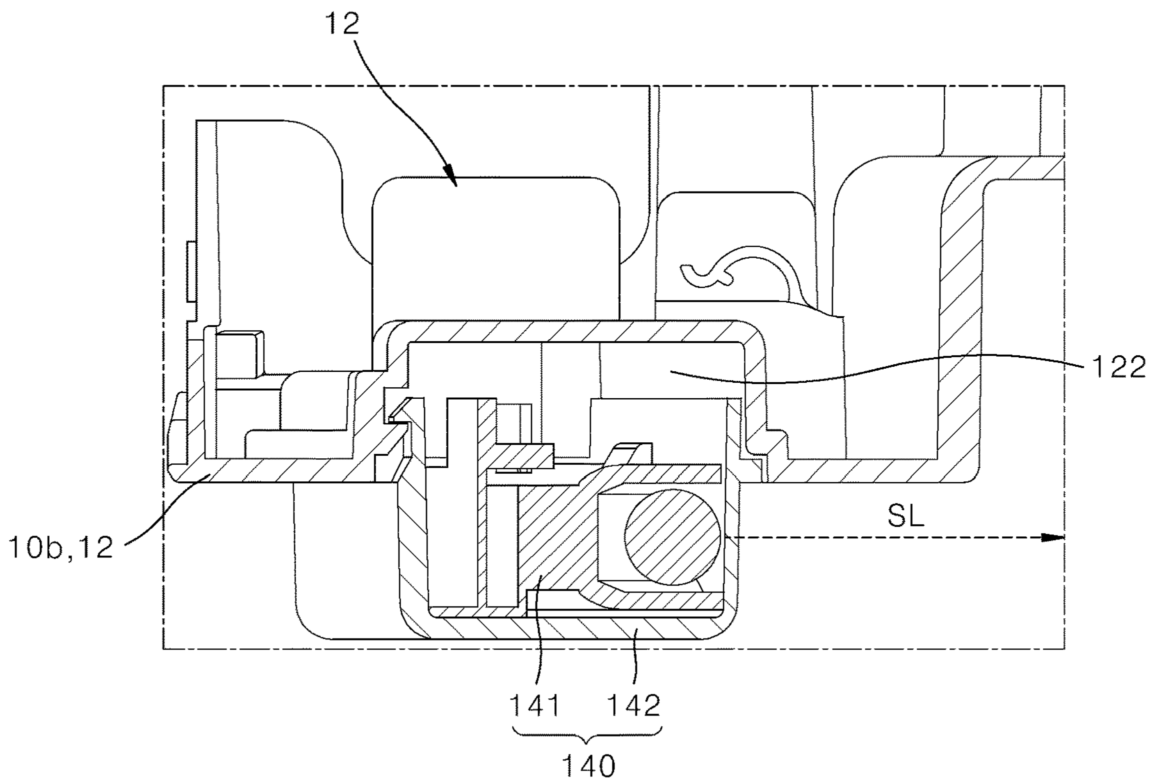
FIG. 10 is a lateral cross-sectional view showing a first upper door at which a sensor part is disposed.

Referring to FIGS. 8 and 10, since the sensor 141 is disposed further downward than the lower surface 10*b* of the first upper door 10, the sensing line SL of the sensor 141 may face toward the front surface of the refrigerator 1 without being interfered with by the lower surface 10*b* of the first upper door 10.

Accordingly, when viewing the refrigerator 1 from the front surface of the refrigerator 1, the user may recognize the sensor 141 and a portion of the sensor cover 142 protecting the sensor 142.

The sensor part 140, as described above, may be disposed horizontally with respect to the up-down direction of the cabinet 2, and the sensing line (SL) may extend in parallel.

Thus, the extension line of the sensing line (SL) may sense near the upper ends of the legs of an ordinary user 6.

For example, in the case where the extension line of the sensing line (SL) senses near the lower ends of the legs of an ordinary adult user 6, a vacant space formed by the user making a specific motion, such as a vacant space between the open legs of the user, may be a blind spot of the sensor part 140, although the user is positioned within the sensible point.

At this time, the sensor part 140 may wrongly sense that the user escapes from the sensible point.

Additionally, in the case where the extension line of the sensing line (SL) senses near the lower ends of the legs of an ordinary adult user 6, the sensor part 140 may operate unnecessarily in the case where a companion pet passes.

In the present disclosure, the sensor part 140 may be disposed horizontally with respect to the up-down direction of the cabinet 2, to target and sense near the upper ends of the legs of an ordinary user.

Thus, a sensing error of the sensor part 140, caused by a blind spot that is created when the user opens the legs, or an operational error of the sensor part 140 caused by an approach of a companion pet may be reduced.

Figure 7:
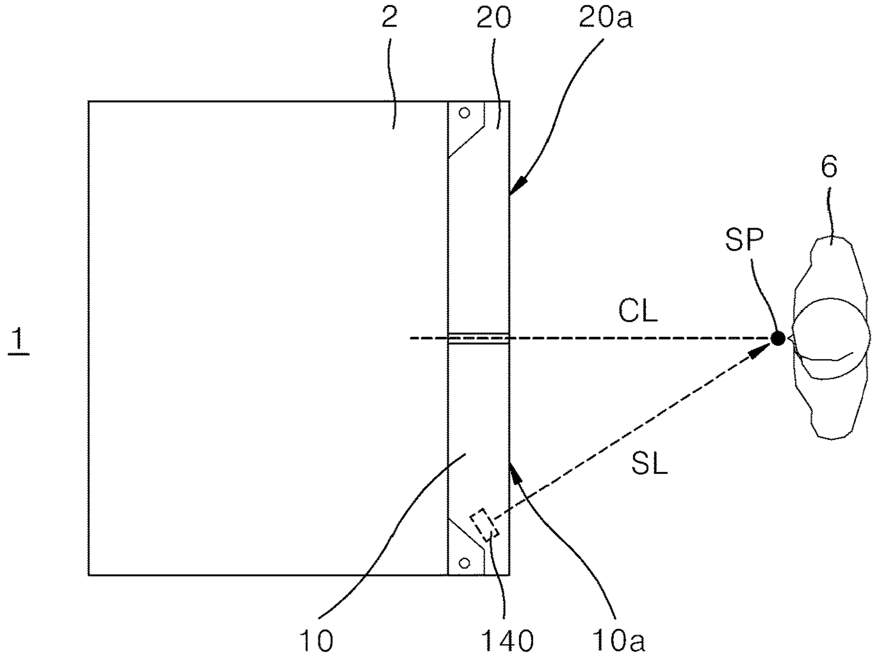
FIG. 7 is a plan view showing a user and a refrigerator that are placed at a point where a sensor part can perform sensing.

Referring to FIG. 7, the sensor part 140 disposed on the lower surface 10*b* of the first upper door 10 may be disposed at a slant, such that the sensor 141 faces a central line (CL) with respect to the left-right direction of the cabinet 2.

Accordingly, the sensing line (SL) extending from the sensor part 140 to the sensible point (SP) of the sensor part 140 may cross the central line (CL).

At this time, the sensible point (SP) may extend further by passing through the point at which the sensing line (SL) crosses the central line (CL), but may be placed on the central line (CL).

Accordingly, the sensible point (SP) placed on the central line (CL) of the sensor part 140 may be a maximum sensible point of the sensor part 140.

For example, the sensible point (SP) may be spaced from the front surfaces of the first upper door 10 and the second upper door 20 by a distance of about 400 mm-800 mm.

Preferably, the sensible point (SP) may be spaced from the front surfaces of the first upper door 10 and the second upper door 20 by a distance of about 600 mm, for example.

The above-described distance between the sensible point (SP) and the front surfaces of the first upper door 10 and the second upper door 20 may correspond to a distance at which the user 6 reaches the first upper door 10 and the second upper door 20 when an ordinary user 6's arm reaches out.

In the present disclosure, since the sensor part 140 sensing an approach of the user is disposed at a slant on the lower surface of the upper door 10, 20, toward the central line (CL), with respect to the left-right direction of the cabinet 2, one sensor part 140 may control the turn on and off of the first lighting part 130 of the first upper door 10 and the second lighting part 230 of the second upper door 20, without disposing an additional sensor part 140 respectively on the lower surface of the pair of upper doors 10, 20.

Further, since the sensible point (SP) of the sensor part 140 crosses the central line (CL) with respect to the left-right direction of the cabinet 2, one sensor part 140 may reduce a blind spot at a time when the sensor part 140 operates.

Figure 6:
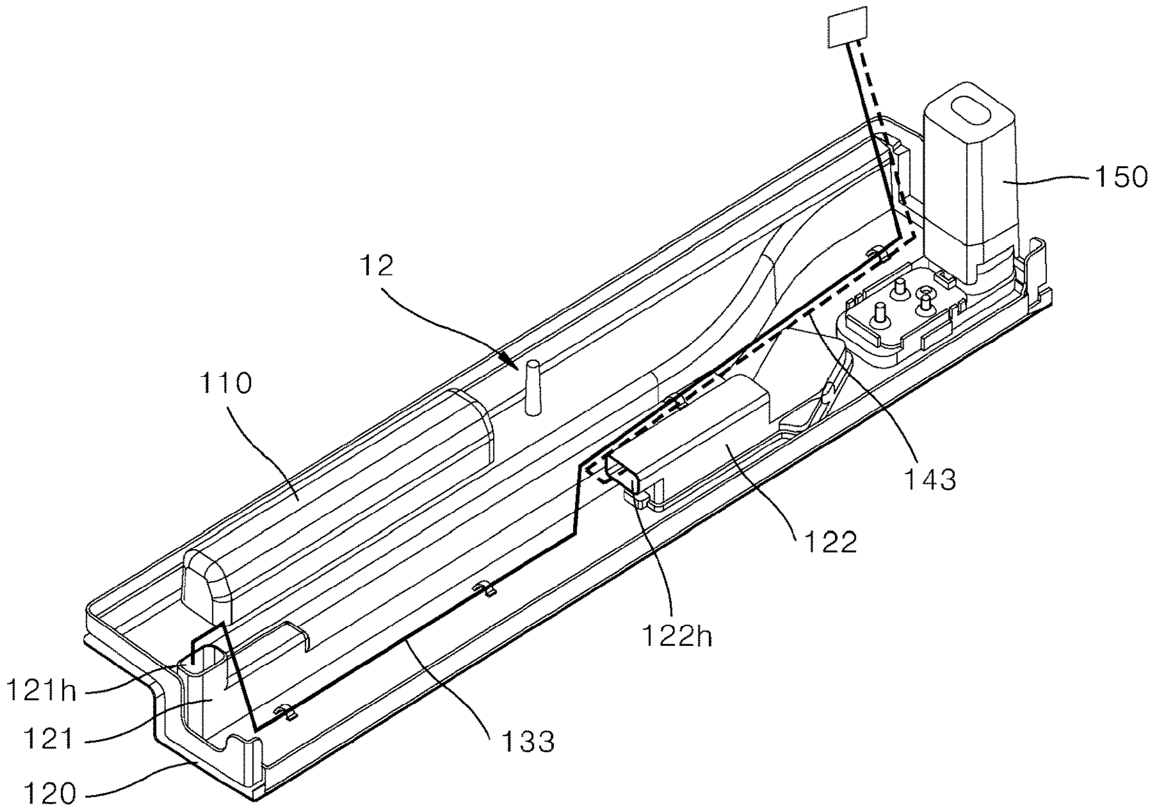
FIG. 6 is a view showing a first lighting member harness and a sensor harness that are drawn in a direction of the upper portion of a first upper door cap deco.

Referring to FIG. 6, a first penetration hole 121*h* communicating with the first insertion groove 121, and a second penetration hole 122*h* communicating with the sensor insertion groove 122 may be formed inside of the upper portion of the first upper door cap deco 12.

A first lighting member harness 133 may connect to the first lighting member 131 through the first penetration hole 121*h*, and a sensor harness 143 may connect to the sensor 141 through the second penetration hole 122*h*, such that a variety of signals and a power source are supplied respectively to the first lighting member 131 and the sensor 141.

Further, a second upper handle part 210, a second lighting part 230 and a second hinge part 250 may sit on the lower surface 20*b* of the second upper door 20.

The second upper handle part 210, the second lighting part 230, and the second hinge part 250 have a substantially similar structure and a substantially similar function to those of the first upper handle part 110, the first lighting part 130 and the first hinge part 150 described above. Accordingly, description in relation to this is omitted.

Further, the second upper handle part 210, the second lighting part 230 and the second hinge part 250 may have a position and a shape that are approximately symmetrical to the position and the shape of the first upper handle part 110, the first lighting part 130 and the first hinge part 150, with respect to the central line (CL) of the refrigerator 1.

The second upper handle part 210 drawn upward inside the second upper door 20, and the second lighting part 230 disposed at the rear of the second upper handle part 210 may be disposed on the lower surface 20*b* of the second upper door 20.

A second protrusion part 220 protruding further downward than the second upper handle part 210 that comprises an second insertion groove drawn upward inside the second upper door 20 may be disposed on the lower surface 20*b* of the second upper door 20, and the second lighting part 230 may be inserted into the second insertion groove.

In an example, the second upper door 20 may comprise a second upper door body part 21 at which the second hinge part 250 rotating around the other side of the cabinet 2 is disposed, and a second upper sub door 22 which is disposed on the front surface of the second upper door body part 21 in a way that the second upper sub door 22 swivels around one side of the second upper door body part 21.

Accordingly, the second upper door 20 may swivel in the state where the second upper door body part 21 and the second upper sub door 22 are coupled, and the second upper sub door 22 may only swivel in the state where the second upper door body part 21 is fixed to the cabinet 2.

At this time, the second protrusion part 220, and the second lighting part 230 inserted into the second protrusion part 220 may be disposed at the second upper door body part 21, and the second upper handle part 210 may be formed at the second upper sub door 22.

Since the second lighting part 230 and the second upper handle part 210 are individually disposed at the second upper door body part 21 and the second upper sub door 22 as described above, the second lighting part 230 and the second upper handle part 210 may be disposed not to be affected by a coupling or a decoupling of the second upper door body part 21 and the second upper sub door 22.

In the drawing of the present disclosure, the sensor part 140 is disposed on the lower surface 10*b* of the first upper door 10, for example, but not limited. Also, the sensor part 140 may be disposed on the lower surface 20*b* of the second upper door 20 in a way that the sensor part 140 is eccentric to the second hinge part 250 with respect to the left-right direction of the second upper door 20.

In the case where the sensor part 140 is disposed on the lower surface 20*b* of the second upper door 20 as described above, the sensor part 140 does not need to be disposed on the lower surface 10*b* of the first upper door 10, and the sensor part 140 on the lower surface 20*b* of the second upper door 20 may be disposed at a slant toward the central line CL with respect to the left-right direction of the cabinet 2.

Figure 9:
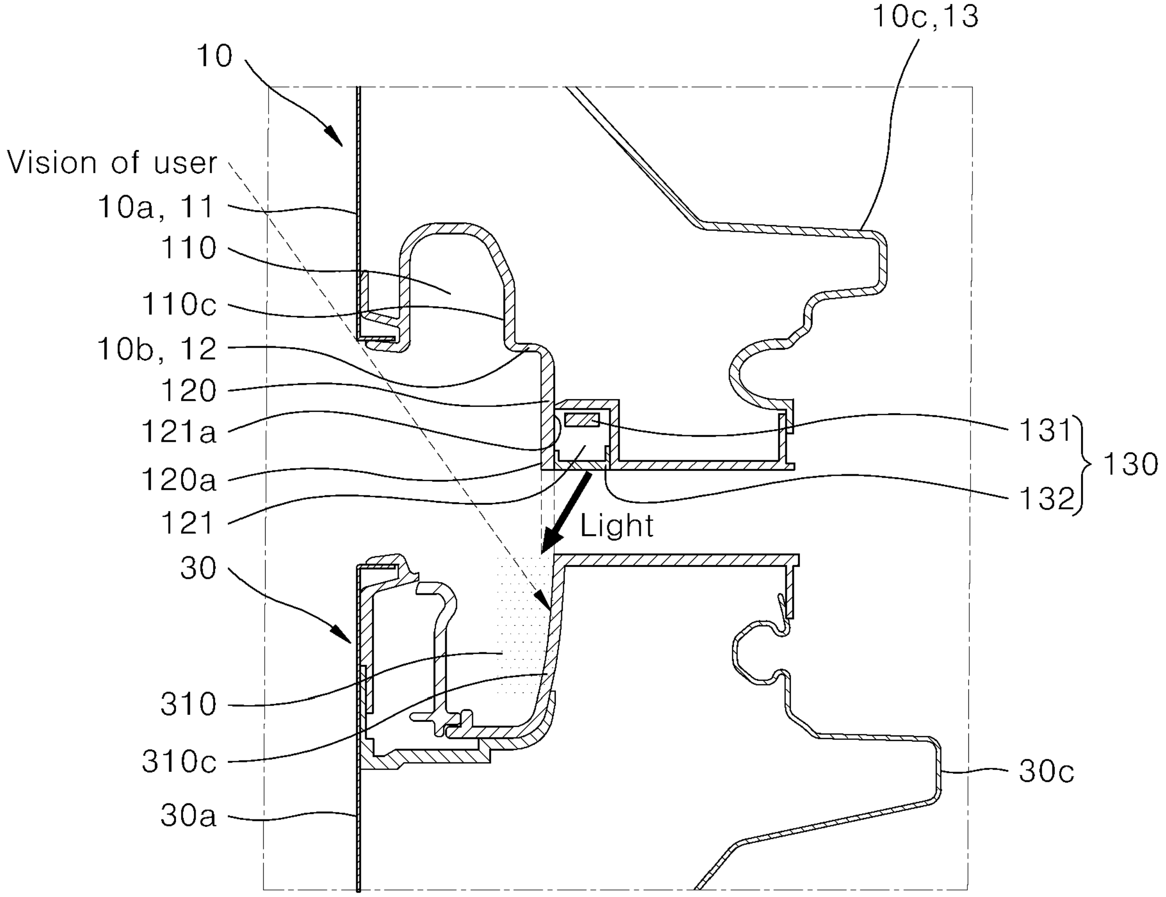
FIG. 9 is a lateral cross-sectional view showing a first upper door at which a first lighting part is disposed and a lower door.

FIG. 9 is a lateral cross-sectional view showing a first upper door 10 at which a first lighting part 130 is disposed and a lower door 30.

The first lighting member 131 of the first lighting part 130 may be disposed to face the lower door 30, and a lower handle part 310 drawn downward inside the lower door 30 may be disposed on the upper surface 30*d* of the lower door 30.

The upper surface 30*d* of the lower door 30 may be embodied as a cap deco that finishes the upper surfaces of the front surface 30*a* of the lower door 30 and the rear surface 30*c* of the lower door 30, but not limited. The upper surface 30*d* of the lower door 30 may be embodied as a coupling form having a variety of structures.

The first upper handle part 110 and the lower handle part 310 may be disposed to overlap at least partially, with respect to the up-down direction of the refrigerator 1.

Specifically, the rear surface 310*c* of the lower handle part 310 may be disposed further rearward than the rear surface 110*c* of the first upper handle part 110.

At this time, the rear surface 310*c* of the lower handle part 310 is formed to have an inclination surface that inclines rearward from the lower portion of the lower handle part 310 toward the upper portion thereof.

For example, the uppermost end of the rear surface 310*c* of the lower handle part 310 may be disposed further rearward than the front surface 120*a* of the first protrusion part 120.

Additionally, the uppermost end of the rear surface 310*c* of the lower handle part 310 may be disposed further rearward than the front surface 121*a* of the first insertion groove 121 into which the first lighting part 130 is inserted, but not limited.

For example, the uppermost end of the rear surface 310*c* of the lower handle part 310 may be disposed at the same position as the front surface 121*a* of the first insertion groove 121 in the front-rear direction, or disposed between the front surface 120*a* of the first protrusion part 120 and the front surface 121*a* of the first insertion groove 121.

In the present disclosure, since the rear surface 310*c* of the lower handle part 310 inclines rearward from the lower portion of the lower handle part 310 to the upper portion thereof, a light radiation angle may be formed such that light of the light part 130, 230 on the lower surface of the upper door 10, 20 is radiated toward the inside of the lower handle part 310.

Thus, the user may easily find the position of the handle part 110, 210 of the lower door 30 as well as the position of the handle part 110, 210 of the upper door 10, 20, by using the lighting part 130, 230 disposed at the upper door 10, 20.

Further, in the present disclosure, since the rear surface 310*c* of the lower handle part 310 inclines rearward from the lower portion of the rear surface 310*c* of the lower handle part 310 to the upper portion thereof, the viewing angle of the user may be ensured such that the user recognizes the rear surface 310*c* of the lower handle part 310 on which light is radiated.

A position relationship between the first upper handle part 110 and the lower handle part 310 is described above. A position relationship between the second upper handle part 210 and the lower handle part 310 may be the same as that between the first upper handle part 110 and the lower handle part 310. Accordingly, detailed description of the position relationship between the second upper handle part 210 and the lower handle part 310 may be omitted.

Figure 11:
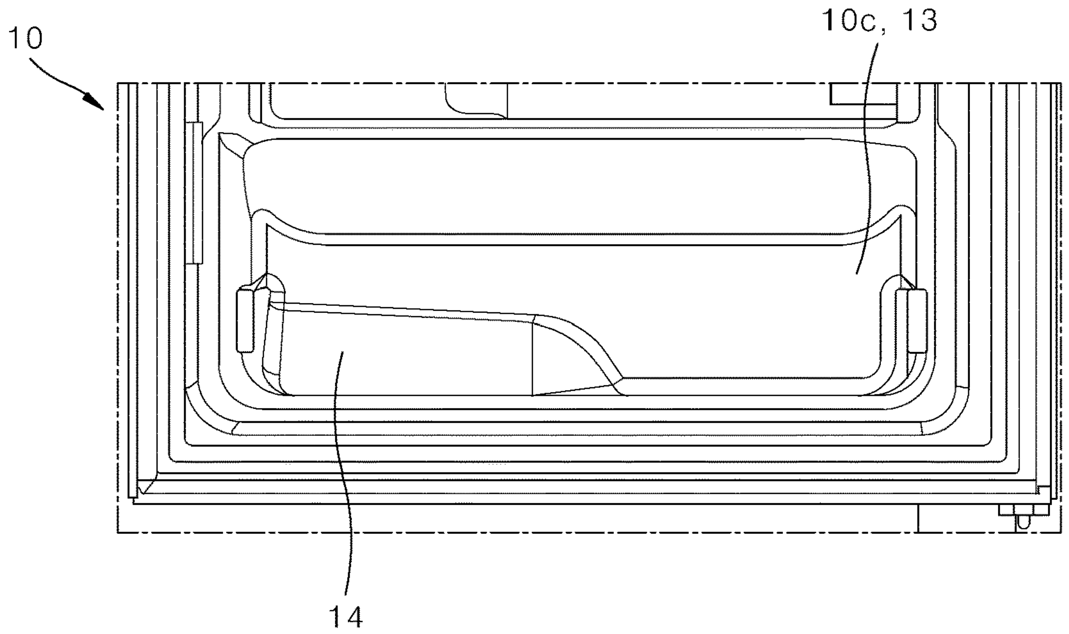
FIG. 11 is a view showing a chamfer part on the rear surface of a first upper door.
Figure 12:
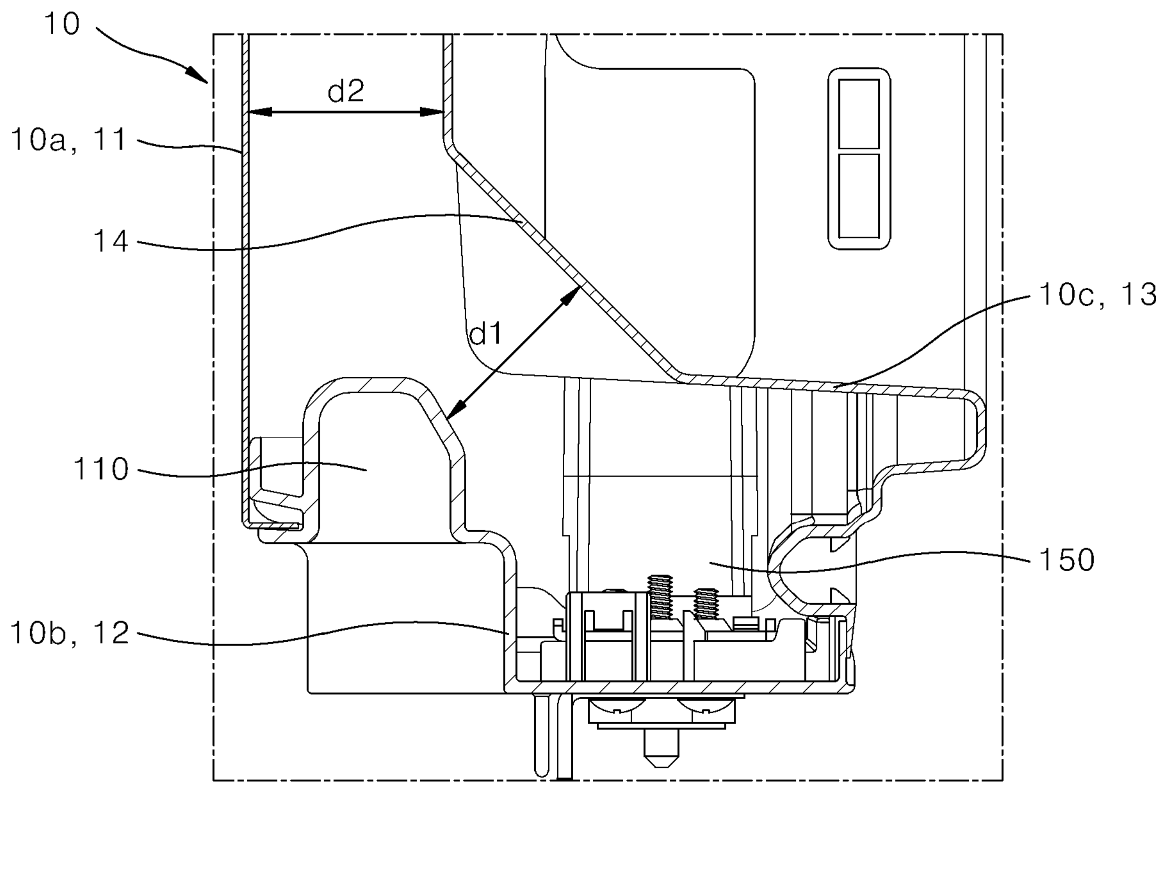
FIG. 12 is a lateral cross-sectional view showing a first upper door at which a chamfer part is formed.

Referring to FIGS. 11 and 12, a chamfer part 14 may be formed at one side of the lower portion of the rear surface 10*c* of the first upper door 10.

For example, the chamfer part 14 may be beveled in a way that the edge portion of one side of the lower portion of the first upper door liner 13 forming the rear surface 10*c* of the first upper door 10 inclines partially.

Accordingly, the area of the rear surface 10*c* of the first upper door 10 corresponding to the chamfer part 14 may be formed to protrude rearward.

Since the first upper handle part 110 is drawn in the upward direction of the first upper door 10, a thermal insulation foam liquid injected into the first upper door 10 may decrease by the drawn area.

In particular, in the case where a distance between the first upper handle part 110 drawn inward and the first upper door liner 13 forming the rear surface 10*c* of the first upper door 10 is too short, a thermal insulation effect may deteriorate significantly at the first upper handle part 110.

In the present disclosure, the chamfer part 14 is formed in a way that a minimum distance d1 between the first upper handle part 110 and the first upper door line 13 where the chamfer part 14 is formed is greater than a minimum distance d2 between the first upper outer door 11 and the first upper door liner 13, preventing deterioration in a thermal insulation effect in the area of the first upper handle part 110.

Figure 13:
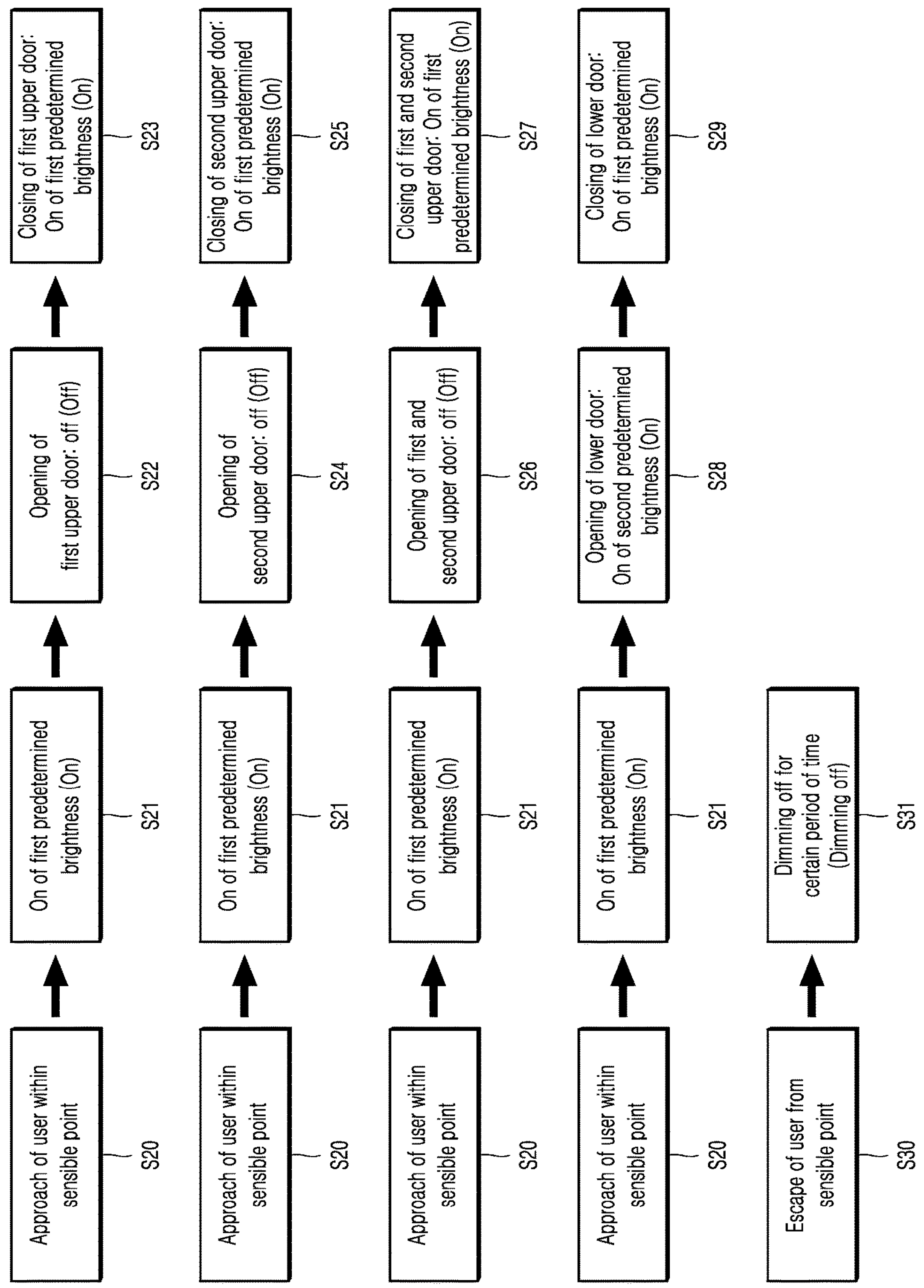
FIG. 13 is a view showing the operation logics of a sensor part, based on various behavior scenarios of a user.
Figure 14:
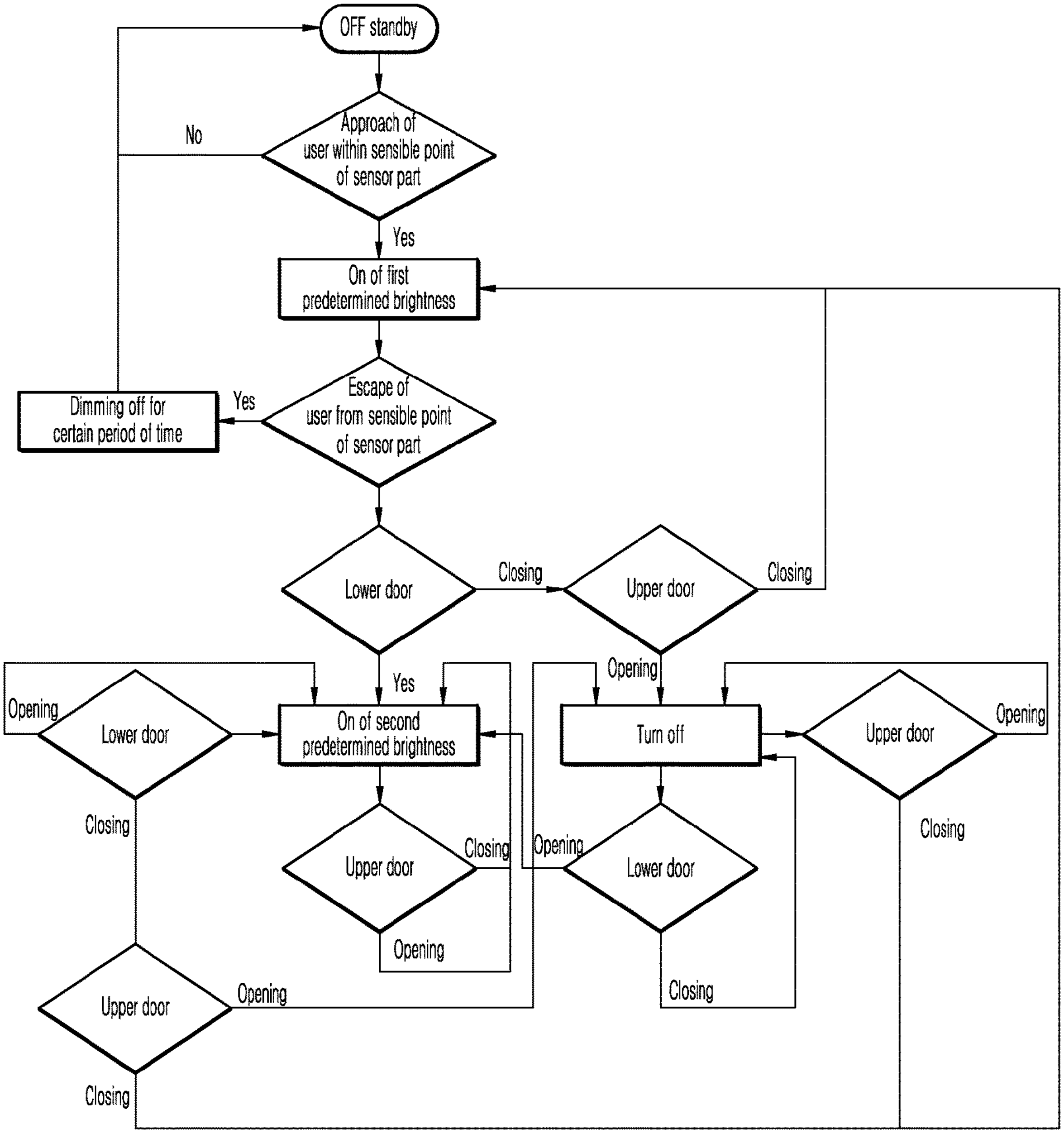
FIG. 14 is a view showing a flow chart of the operations of a sensor part, based on various behavior scenarios of a user.

FIG. 13 is a view showing the operation logics of a sensor part, based on various behavior scenarios of a user, and FIG. 14 is a view showing a flow chart of the operations of a sensor part, based on various behavior scenarios of a user.

As the sensor part 140 senses an approach of the user (S20), the first lighting part 130 and the second lighting part 230 may be turned on in first predetermined brightness (S21).

At this time, the first predetermined brightness may be approximate 50% of the maximum brightness of the first lighting part 130 and the second lighting part 230, but not limited.

In the case where one or more of the first upper door 10 and the second upper door 20 is opened, the first lighting part 130 and the second lighting part 230 may be turned off (S22, S24, S26).

Additionally, in the case where the first upper door 10 and the second upper door 20 are closed, in the state where the sensor part 140 senses an approach of the user, the first lighting part 130 and the second lighting part 230 may be turned on in the first predetermined brightness (S23, S25, S27).

Further, in the case where the sensor part 140 senses an approach of the user, the first lighting part 130 and the second lighting part 230 may be turned on in the first predetermined brightness (S21).

In the case where the lower door 30 is opened, the first lighting part 130 and the second lighting part 230 may be turned on in second predetermined brightness that is greater than the first predetermined brightness (S28).

At this time, the second predetermined brightness may be approximately 100% of the maximum brightness of the first lighting part 130 and the second lighting part 230, but not limited.

In the case where the lower door 30 is opened as described above, the brightness of the first lighting part 130 and the second lighting part 230 are adjusted to maximum brightness, such that the first lighting part 130 and the second lighting part 230 serve as an indoor light of the lower storage compartment 4, thereby enhancing user convenience further.

In the case where the lower door 30 is closed in the state where the sensor part 140 senses an approach of the user, the first lighting part 130 and the second lighting part 230 may be turned on in the first predetermined brightness (S29).

Additionally, in the case where the sensor part 140 senses an approach of the user, the first lighting part 130 and the second lighting part 230 are turned on in the first predetermined brightness, and in the case where the user escapes from a sensible point of the sensor part 140 (S30), the first lighting part 130 and the second lighting part 230 may dim off slowly for a certain period of time (S31).

At this time, the first lighting part 130 and the second lighting part 230 dim off after a certain period of time, e.g., approximately three seconds, but not limited.

Further, since the first lighting part 130 and the second lighting part 230 are controlled to dim off slowly as the user escapes from the sensible point, the aesthetic qualities of the refrigerator 1 may improve in terms of design.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the range of the disclosure though not explicitly described in the description of the embodiment.

What is claimed is:

1. A refrigerator, comprising:

a cabinet having (i) an upper storage compartment and (ii) a lower storage compartment disposed below the upper storage compartment;

an upper door configured to open and close at least a portion of the upper storage compartment; and a lower door configured to open and close at least a portion of the lower storage compartment, wherein the upper door comprises:

an upper handle recessed upward from a bottom surface of the upper door toward an inside the upper door, and a lighting disposed at the bottom surface of the upper door, the lighting being disposed rearward and downward relative to the upper handle.

2. The refrigerator of claim 1, wherein the upper door further comprises:

a protrusion that is disposed at the bottom surface of the upper door and protrudes downward relative to the upper handle, the protrusion defining an insertion groove that is recessed upward from the bottom surface of the upper door and receives the lighting.

3. The refrigerator of claim 2, wherein the lighting faces the lower door, wherein the lower door comprises a lower handle that is recessed downward from a top surface of the lower door, and wherein a rear surface of the lower handle is disposed rearward relative to a rear surface of the upper handle.

4. The refrigerator of claim 3, wherein the rear surface of the lower handle is inclined rearward from a lower portion of the lower handle to an upper portion of the lower handle.

5. The refrigerator of claim 1, wherein the upper door comprises:

an upper outer door that defines a front surface of the upper door;

an upper door liner that defines a rear surface of the upper door; and an upper door cap deco that defines the bottom surface of the upper door, and wherein the upper handle and the lighting are disposed at the upper door cap deco.

6. The refrigerator of claim 5, wherein the upper door defines a chamfer at the rear surface of the upper door, and wherein a minimum distance between the upper handle and the chamfer is greater than a minimum distance between the upper outer door and the upper door liner.

7. The refrigerator of claim 1, wherein the upper door further comprises a hinge configured to rotate around one side of the cabinet, the hinge being disposed rearward relative to the upper handle, and wherein the hinge and the lighting overlap each other along an extension line in a left-right direction of the upper door.

8. The refrigerator of claim 1, wherein the upper door further comprises a sensor disposed at the bottom surface of the upper door, the sensor having a surface that is inclined relative to a front surface of the upper door and faces a central line that extends forward from a left-right center portion of the cabinet.

9. The refrigerator of claim 8, wherein the sensor comprises a proximity sensor configured to sense an approach of a user.

10. The refrigerator of claim 8, wherein the sensor is configured to detect an object within a sensible range thereof, and wherein a sensing line extending from the sensor to a point in the sensible range intersects the central line.

11. The refrigerator of claim 8, wherein a maximum sensible point of the sensor is on the central line.

12. The refrigerator of claim 8, wherein the sensor is disposed horizontally with respect to an up-down direction of the cabinet.

13. The refrigerator of claim 8, wherein the upper door further comprises a hinge configured to rotate around one side of the cabinet, and wherein the sensor is located closer to the hinge than to another side of the cabinet that is spaced apart from the one side of the cabinet in a left-right direction of the upper door.

14. The refrigerator of claim 8, wherein the sensor protrudes downward relative to the bottom surface of the upper door.

15. The refrigerator of claim 1, wherein the upper door further comprises:

an upper door body comprising a hinge, the hinge being configured to rotate around a side of the cabinet; and an upper sub door that is disposed at a front surface of the upper door body and configured to rotate relative to the upper door body, and wherein the lighting is disposed at the upper door body, and the upper handle is defined at the upper sub door.

16. The refrigerator of claim 1, further comprising a sensor configured to sense an approach of a user, wherein the upper door further comprises:

a first upper door configured to open and close a first portion of the upper storage compartment, a second upper door configured to open and close a second portion of the upper storage compartment, a first lighting disposed at the first upper door, and a second lighting disposed at the second upper door, and wherein the first lighting and the second lighting are configured to:

emit light in a first predetermined brightness based on the sensor detecting the approach of the user, turn off based on at least one of the first upper door or the second upper door being opened while emitting the light in the first predetermined brightness, and emit light in the first predetermined brightness based on the first upper door and the second upper door being closed.

17. The refrigerator of claim 1, further comprising a sensor configured to sense an approach of a user, wherein the upper door further comprises:

a first upper door configured to open and close a first portion of the upper storage compartment, a second upper door configured to open and close a second portion of the upper storage compartment, a first lighting disposed at the first upper door, and a second lighting disposed at the second upper door, and wherein the first lighting and the second lighting are configured to:

emit light in a first predetermined brightness based on the sensor detecting the approach of the user, emit light in a second predetermined brightness greater than the first predetermined brightness based on the lower door being opened while emitting the light in the first predetermined brightness, and emit light in the first predetermined brightness based on the lower door being closed while emitting the light in the second predetermined brightness.

18. The refrigerator of claim 1, further comprising a sensor configured to sense an approach of a user, wherein the upper door further comprises:

a first upper door configured to open and close a first portion of the upper storage compartment, a second upper door configured to open and close a second portion of the upper storage compartment, a first lighting disposed at the first upper door, and a second lighting disposed at the second upper door, and wherein the first lighting and the second lighting are configured to:

emit light in a first predetermined brightness based on the sensor detecting the approach of the user, and emit light in a reduced brightness from the first predetermined brightness based on the user escaping from a sensible range of the sensor.

19. The refrigerator of claim 18, wherein the first lighting and the second lighting are configured to emit the light in the reduced brightness for a predetermined period.

20. The refrigerator of claim 18, wherein the sensor is disposed at one of the first upper door or the second upper door.

* * * * *